United States Patent
Frazierr

[11] 3,975,109
[45] Aug. 17, 1976

[54] Z-AXIS DRIVE ASSEMBLY

[75] Inventor: James L. Frazierr, Los Alamitos, Calif.

[73] Assignee: Houdaille Industries, Inc., Buffalo, N.Y.

[22] Filed: Aug. 29, 1975

[21] Appl. No.: 608,899

[52] U.S. Cl. .................................. 408/35; 29/46; 74/640; 408/135
[51] Int. Cl.² .......................................... B23B 34/20
[58] Field of Search ............... 408/17, 35, 129, 135; 29/46; 74/640, 841, 842; 173/160

[56] References Cited
UNITED STATES PATENTS

| | | | |
|---|---|---|---|
| 2,501,177 | 3/1950 | Karweit | 74/842 |
| 2,776,584 | 1/1957 | Burg | 408/35 X |
| 3,091,979 | 6/1963 | Schaeffer et al. | 74/640 |
| 3,187,862 | 6/1965 | Musser | 74/640 X |
| 3,822,961 | 7/1974 | Lay | 408/135 X |

*Primary Examiner*—Othell M. Simpson
*Assistant Examiner*—Fred A. Silverberg
*Attorney, Agent, or Firm*—Hill, Gross, Simpson, Van Santen, Steadman, Chiara & Simpson

[57] ABSTRACT

A Z-axis drive assembly for a turret machining center incorporates a variable speed DC motor mounted on a vertically adjustable carriage and connected through a harmonic drive unit to rotate a pinion. The pinion forms part of a rack and pinion mechanism, for controlling the vertical elevation of the rack relative to the carriage.

13 Claims, 5 Drawing Figures

Z-AXIS DRIVE ASSEMBLY

BACKGROUND OF THE INVENTION

1. Field of the Invention

The present invention relates to turret machining centers, and more particularly to turret machining centers equipped with variable speed drive for the Z-axis or spindle feed direction.

2. The Prior Art

Turret machining centers are versatile machines which are adapted for boring and milling work, using a plurality of tools mounted on individual spindles spaced around the periphery of a turret. When a new tool is desired, the turret indexes to bring the desired tool into operating position, and the entire turret is adapted for vertical up-and-down movement to execute boring operations.

Because a variety of tools may be used in connection with the various spindles on the turret, it is necessary to provide some mechanism for providing for a variety of different feed speeds in the vertical direction, or, as hereinafter referred to, along the Z-axis. Although various mechanisms have been developed in the prior art for effecting a drive in the Z-axis, they have been relatively complicated and expensive to manufacture.

SUMMARY OF THE INVENTION

It is a principal object of the present invention to provide a variable speed drive for the Z-axis of a turret machining center which is simpler and more economical to manufacture than previously known devices.

Another object of the present invention is to provide a variable speed drive for the Z-axis of a turret machining center which is compact in size.

A further object of the present invention is to provide a variable speed drive for the Z-axis of a turret machining center which is mechanically efficient.

Another object of the present invention is to provide a variable speed Z-axis drive for a turret machining center which is lightweight and relatively small in size.

These and other objects and advantages of the present invention will become manifest by an inspection of the accompanying drawings and the following description.

In one embodiment of the present invention, there is provided a carriage adjustably mounted on a vertical supporting column, a variable speed DC motor mounted on the carriage, a harmonic drive unit mounted on the carriage and driven by the motor, and a pinion connected to the output shaft of the harmonic drive unit to be driven thereby, guide means mounted on the carriage, and a turret supported in moveable relationship with said guide and having a vertically disposed rack in engagement with said pinion, whereby movement of the turret in the Z-axis is controlled by said variable speed motor, through the harmonic drive unit.

BRIEF DESCRIPTION OF THE DRAWINGS

Reference will now be made to the accompanying drawings, in which.

DESCRIPTION OF THE PREFERRED EMBODIMENT

Figure 1:
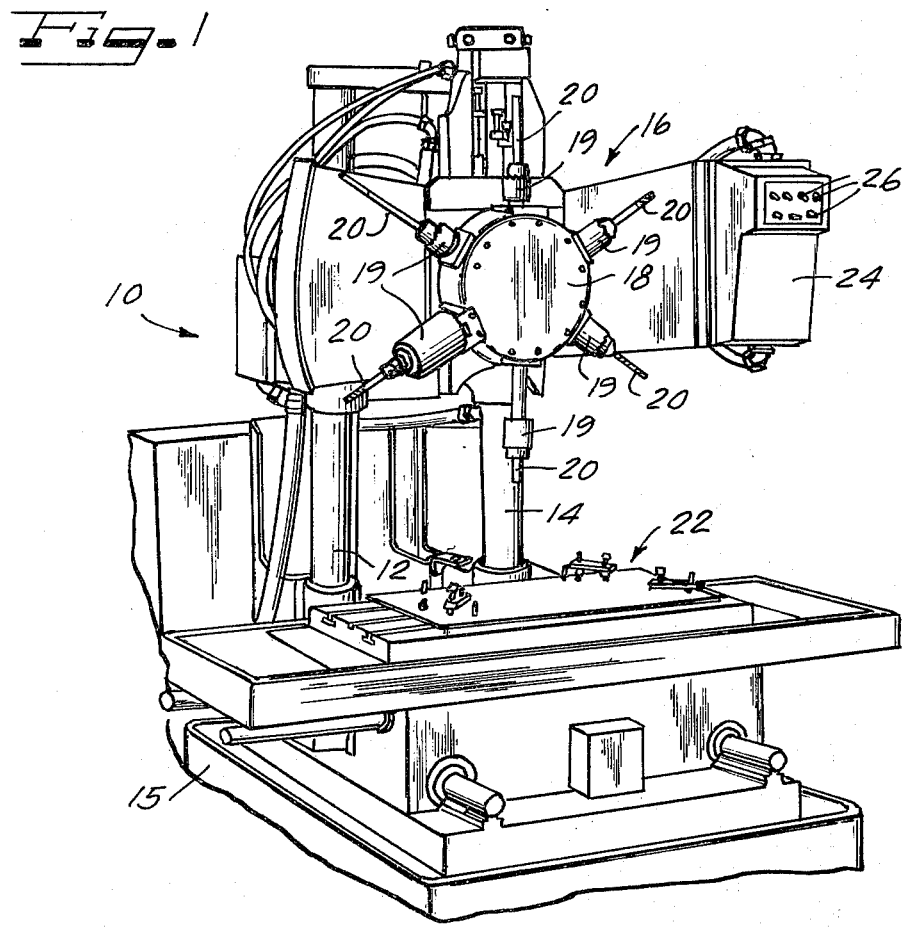
FIG. 1 is a perspective view of the front of a turret machining center incorporating an illustrative embodiment of the present invention.

A turret machining center 10 is illustrated in FIG. 1, and is provided with a pair of vertical columns 12 and 14 supported by a base 15. A carriage 16 is mounted in vertically adjustable relation on the columns 12 and 14. A turret 18 is mounted for slidable vertical movement relative to the carriage 16, and supports a plurality of spindles equally spaced about the periphery of the turret 18. Each of the spindles is provided with a chuck 19 and an individual tool 20.

The spindle which is at the bottom of the turret 18 is in operating position, and its tool 20 cooperates with work which is supported on a table 22, positioned below the operative tool. For boring operations the turret 18 is driven downwardly (along the Z-axis) to bring the operating tool 20 into engagement with the work, and the Z-drive continues until the desired depth has been reached, after which the turret 18 is raised along its Z-axis to withdraw the tool 20 from the work. Subsequently, the table 22 may index (by means not shown) to bring a different portion of the work into position under the operative tool, and the same or different tool may be used to execute the desired machining operation. When a tool change is desired, the turret 18 is rotated to index a new tool into operating position.

A control box 24 is mounted on the carriage 16 and a front panel of the control box has six controls 26 mounted thereon. The controls 26 are provided for individually selecting the desired speed of downward drive in the Z-axis for the six index positions of the turret 18. A separate control 26 is provided for each index position, so that the Z-axis feed of each tool 20 may be controlled independently of the others.

Figure 2:
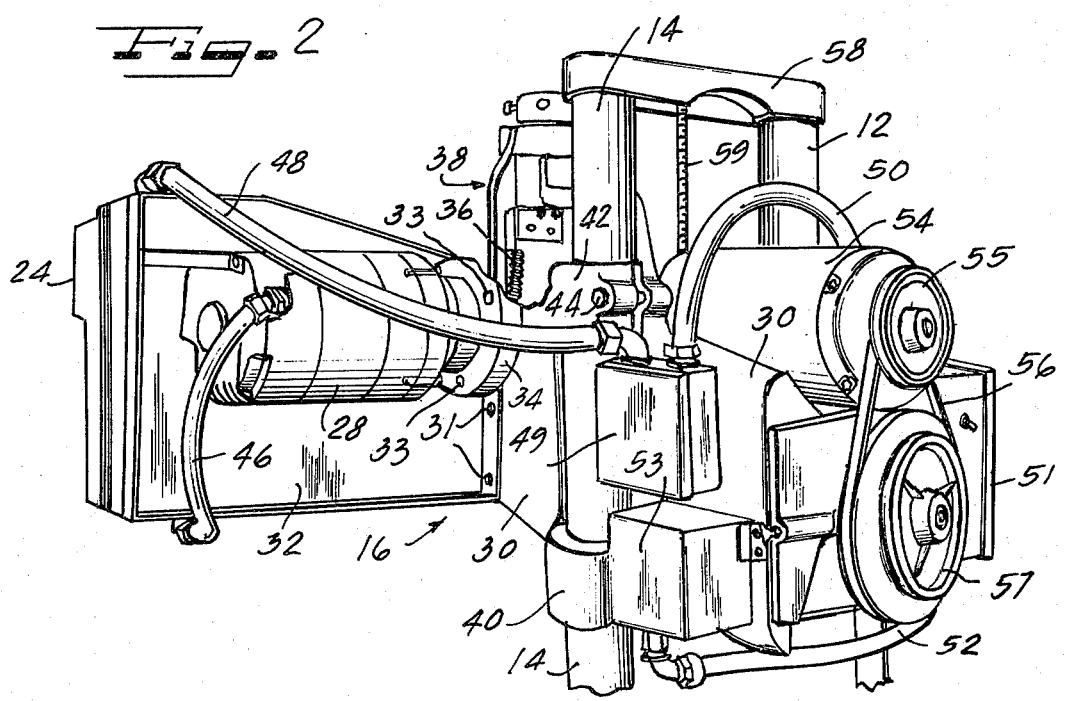
FIG. 2 is a perspective view of the rear of a portion of the apparatus of FIG. 1.

As shown in FIG. 2, the carriage 16 has a frame with a forwardly extending frame member 30. A laterally extending wing 32 is secured to the frame 30 by screws 31, and the control box 24 is mounted on the front of the wing 32. A DC motor 28 is connected to the rear side of the wing 32, with its shaft disposed in a horizontal direction, and a harmonic drive unit 34 is bolted to the frame 30, by means of bolts 33. The motor 28 is also bolted to the harmonic drive unit 34, so the motor 28 and the harmonic drive unit 34 form a single rigid assembly supported by the frame 30. The frame 30 has an aperture aligned with the axis of rotation of the harmonic drive unit 34, and the output shaft of the harmonic drive 34 unit extends through the aperture to drive a pinion 50 (not shown in FIG. 2). The pinion cooperates with a rack 36, shown in FIG. 2 through a broken-away portion of the frame 30. The rack 36 is connected to an assembly 38, which includes the turret 18. The turret assembly 38 is guided for vertical movement relative to the frame 30 by a vertically disposed guide mounted on the frame 30, and the elevation of the assembly 38 is thus adjusted by rotation of the motor 28.

The frame 30 is provided with a collar 40, which is slidable on the column 14, and with a split collar 42, which is also slidable on the column 14. A bolt 44, which connects the separate portions of the split collar 42 together, is tightened to fix the position of the carriage 16 relative to the column 12.

Although not shown in FIG. 2, the carriage includes a second frame on the opposite side of the machine, with collars corresponding to the collar 40 and the split collar 42 slidable on the other vertical column 14, and with a second guide for the turret assembly 38. The two frames are connected together to form a single rigid structure, and are preferably formed integrally with each other. The two guides for the turret assembly 38 insure stability of the turret assembly 38 and restrict movement of the turret assembly relative to the carriage 16 to a vertical direction only.

A cable 46 interconnects the control box 24 with the motor 28, and another cable 48 interconnects the control box 24 with a junction box 49. The junction box 49 is connected by a cable 50 to a junction box 51, and a further cable 52 connects the box 51 to another junction box 53. A source of electrical power is supplied to the junction box 53.

A motor 54 is mounted on the carriage 16, and drives a pulley 55 which is connected by a belt 56 to another pulley 57. The pulley 57 is connected to the drive shaft of the turret indexing mechanism, which includes a one-revolution clutch, so the turret is indexed when the clutch is operated. The motor 54 runs continuously and rotates the spindle through a conventional power train. The current index position is identified by signals originated by the indexing mechanism and transmitted over the cable 48 to the box 24, to select the control 26 corresponding to the spindle which is in operating position.

The two columns 12 and 14 are interconnected at their upper ends by a beam 58, and the threaded shaft 59 of a bolt extends downwardly through an aperture in the beam 58 and is received in a threaded bore (not shown) in the carriage. The carriage may be raised and lowered relative to the columns 12 and 14 by rotating the shaft 59.

Figure 3:
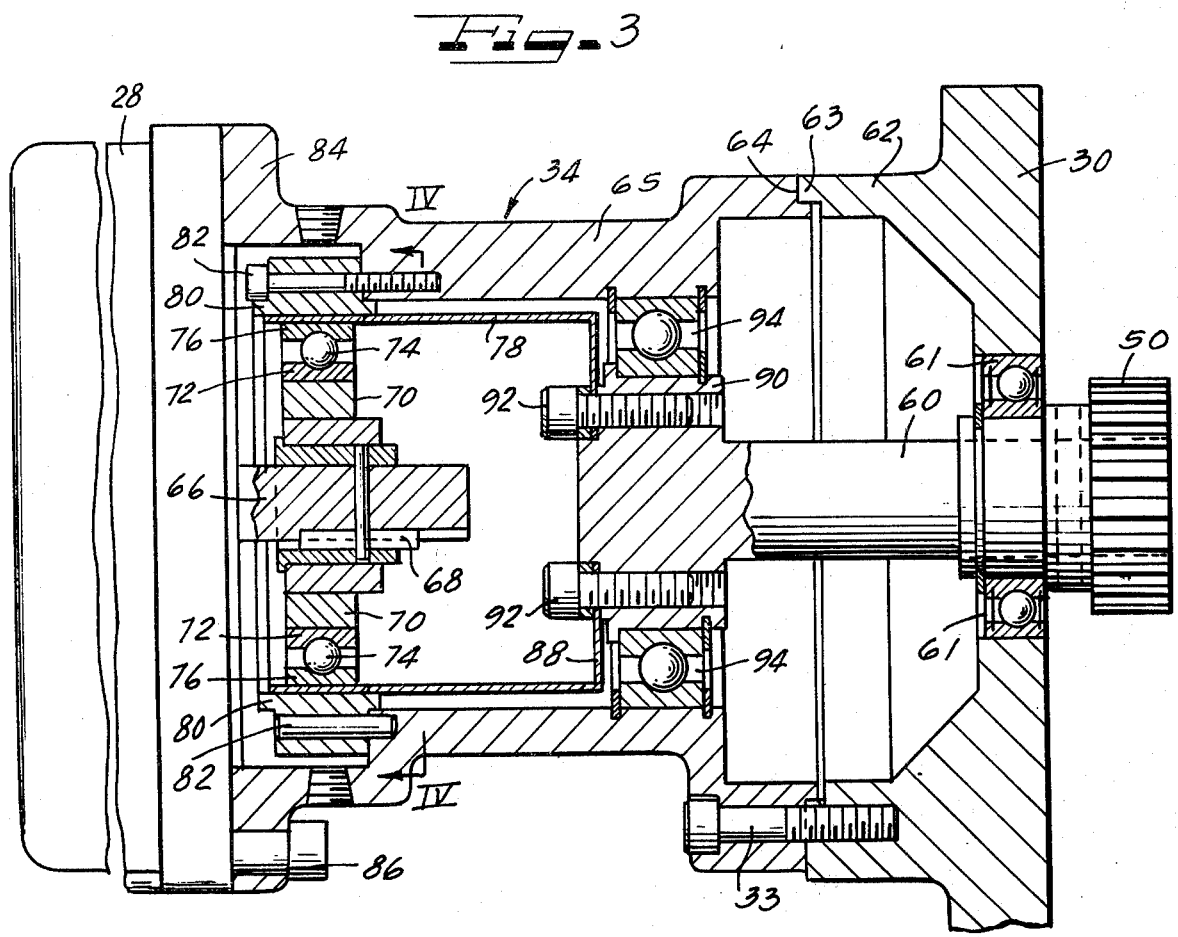
FIG. 3 is a side elevation, partly in cross section, of the Z-axis drive assembly illustrated in FIG. 2.

Referring now to FIG. 3, a cross section of the harmonic drive unit 34 is shown, in association with a portion of the variable speed DC motor 28 and the spindle 50. The frame 30 has an aperture for receiving the output shaft 60 of the harmonic drive unit, and a bearing assembly 61 is mounted in the aperture and receives the shaft 60. The pinion 50 is connected to the end of the shaft 60.

The frame 30 has a cup-like protuberance 62 extending toward the harmonic drive unit 34, and an annular lip 63 is provided at the outside edge of the end wall of the protuberance 62. The lip 63 fits into an annular recess provided at the outside edge of the end of a case 65 which encloses the harmonic drive unit 34. The case 65 is secured to the frame 30 by means of bolts 33, and the lip 63 and recess 64 function to locate the harmonic drive in accurate position relative to the bearing 61, so that the pinion 50 is in correct position for engagement with the rack 36.

The output shaft 66 of the motor 28 is keyed by means of a key 68 to a wave generator 70 of the harmonic drive. The wave generator 70 comprises an eliptically-shaped member, on the periphery of which is mounted a member with a peripheral groove, for supporting a plurality of balls 74. The balls 74 are held in place by a hoop 76 which surrounds the member 70 and which is supported at the interior of the driving end of a flex spline 78, urging the exterior of the flex spline 78 into engagement with a circular spline 80, which is bolted in position relative to the case 65 by means of bolts 82. The end of the case 65 adjacent the motor 28 terminates in a flange 84 to which the motor 28 is bolted by bolts 86.

The flex spline 78 is in the form of a cup-shaped flexible member, with its driven end at the lip of the cup and its driving end at the base 88 of the cup. The base 88 is bolted to a flange 90 provided on the interior end of the shaft 60 by means of bolts 92. A bearing assembly 94 is secured to the interior of the case 65, for supporting the flange 90.

Figure 4:
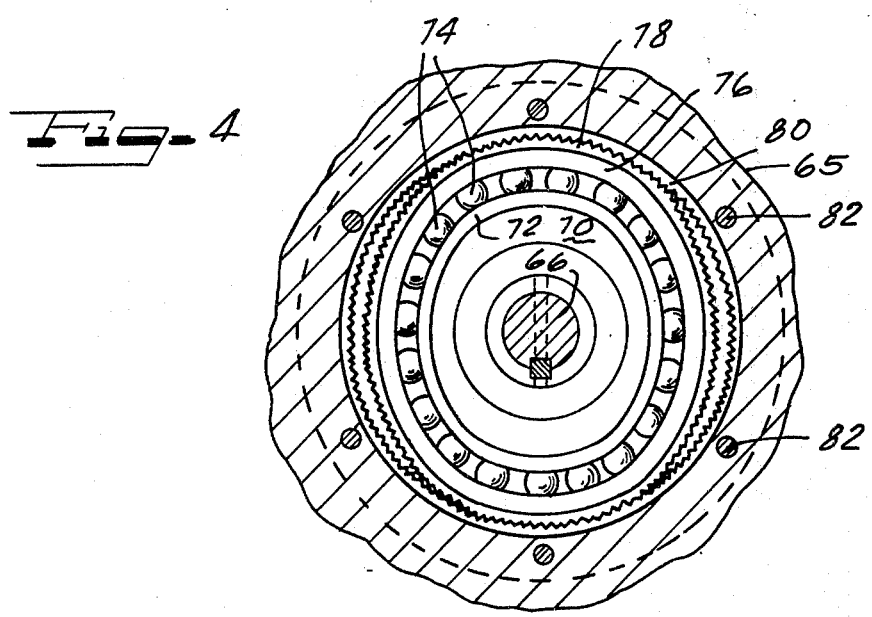
FIG. 4 is a cross sectional view, taken in the plane IV—IV in FIG. 3.

The operation of the harmonic drive unit is best understood by referring to FIG. 4, which is a cross sectional view of a portion of the apparatus shown in FIG. 3. A different number of teeth are provided on the circular spline 80 than are present on the flex spline 78, so that the flex spline 78 rotates at a reduced speed relative to the motor shaft 66, in dependence on the differential between the number of teeth provided on the flex spline 78 and on the circular spline 80. In addition to a reduction of speed of the shaft 60 relative to the shaft 66, there is a corresponding magnification of the torque applied to the shaft 60 relative to that present at the shaft 66. Accordingly, the electric motor 28 rotates at a relatively high speed, which contributes to the smoothness of the drive and the electrical efficiency of operation of the motor, while the pinion 50 is rotated at a relatively slow speed with a greatly magnified torque, so that the desired Z-axis feed rate can be achieved, irrespective of the load imposed by the work.

The interior of the chamber defined between the frame 30 and the case 65, and also the interior of the chamber defined by the flex spline 78, are partially filled with oil to provide lubrication for the bearings 61 and 94 and for the flex spline 78 and its wave generator 70.

The details of the variable speed arrangement for the electric motor 28 form no part of the present invention, and many different circuits for controlling the speed of electric motors are known to those skilled in the art. Any of the well known circuits may be used. Preferably an SCR or triac speed control is used in the conventional way for deriving a variable DC voltage from an AC supply voltage, to vary the speed of the motor 28. The relative angle of conduction of the thyristors, during each cycle of the AC voltage, is controlled by a potentiometer which is adjusted by rotating one of the controls 26 (FIG. 1). Only one of the six potentiometers mounted in the control box 25 is selected at any one time to control the degree of conduction of the thyristor, and the selected one corresponds to the tool which is in operating position.

The entire Z-axis drive assembly, including the speed selecting control, the DC motor, the harmonic drive unit and the pinion 50, form an extremely compact unit, which is both electrically and mechanically efficient, in comparison with previously known systems. The relatively small size and low weight of the assembly help to minimize the size and weight of the carriage 16, and facilitate vertical adjustments of the carriage 16 relative to the columns 12 and 14. A wide variety of speeds are available for Z-axis feed, in accordance with the setting of the appropriate control 26, and an extremely high torque is applied to the rack and pinion mechanism by the harmonic drive unit for any selected speed, because of the torque magnification effect of the harmonic drive unit 34. The harmonic drive is preferably selected to reduce the speed of the motor by a ratio of 80:1, which gives an increase in torque in the ratio of 80:1.

Figure 5:
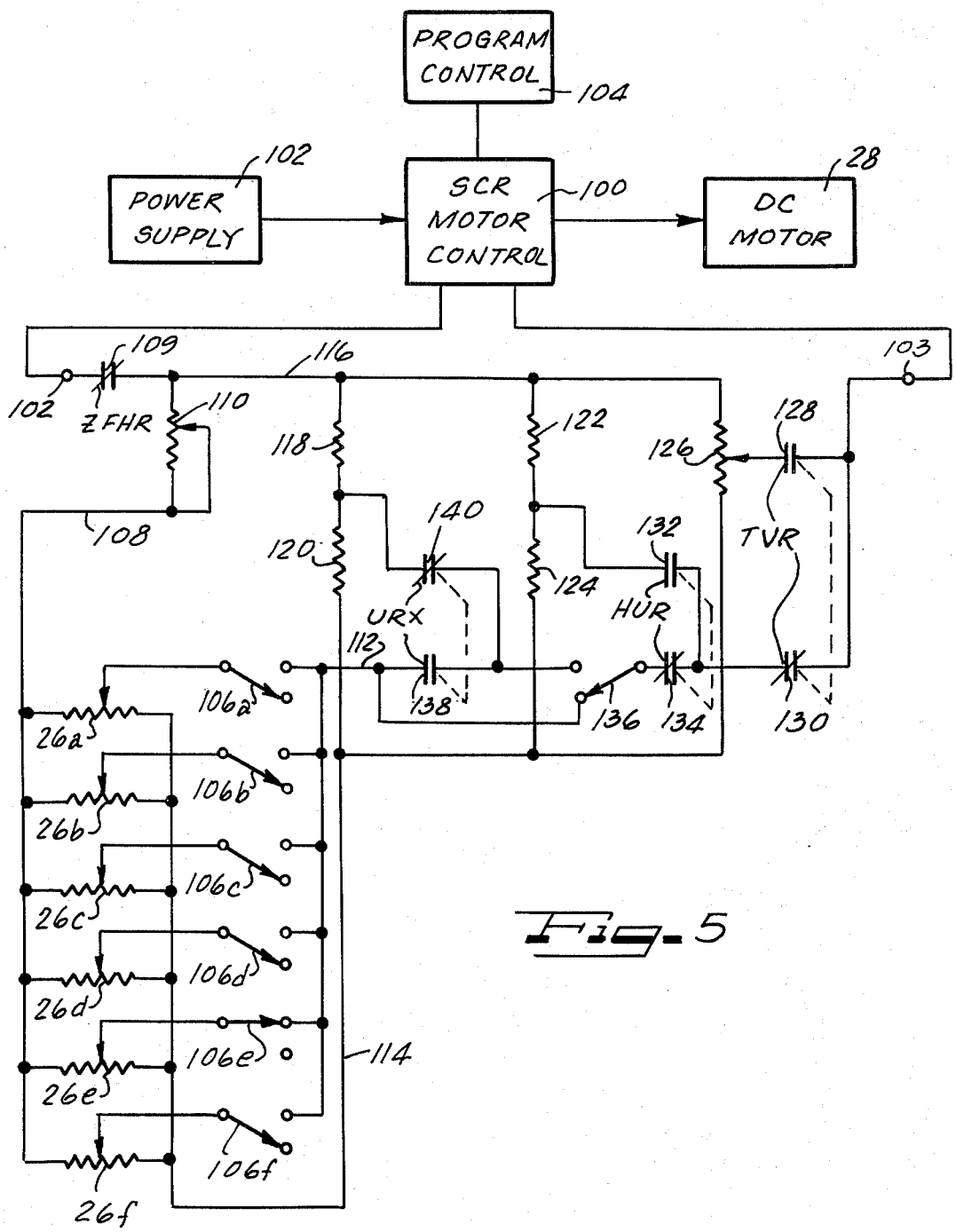
FIG. 5 is a schematic circuit diagram, partly in functional block diagram form, of the motor control circuit for the Z-axis drive.

Referring now to FIG. 5, a schematic diagram of the Z-axis feed speed control circuit is illustrated. The DC motor 28 is controlled by an SCR motor control unit 100, which is connected to a source of electrical power 102 and a program control unit 104. The program control unit includes a numerical control device, so that the operation of the motor 28 is controlled in accordance with a predetermined program, as is conventional in the art.

The SCR motor control unit 100 is connected to two terminals 102 and 103, and the resistance between the terminals 102 and 103 determines the speed of operation of the DC motor 28 at any given time. The six potentiometers 26a–26f, which are adjustable by the controls 26, are included in the circuit between the terminals 102 and 103. Each is associated with a corresponding cam operated switch 106a–106f, and one of the cam operated switches is in its closed position, depending upon the position of the turret 18. The mechanical arrangements of such cam operated switches are well known and are therefore not described in detail herein.

One end terminal of each of the potentiometers 26a–26f is connected in common to a line 108, and the line 108 is connected to the terminal 102 through a rheostat 110 and a normally closed contact 109 of a ZFHR relay. This contact is operated by the ZFHR relay (not shown) within the program control unit 104. The contact 109 is always closed when the Z-axis feed is energized.

The taps of the potentiometers 26a–26f are connected individually through the switches 106a–106f to a common line 112. The other end of each of the potentiometers 26a–26f is connected in common to a line 114.

A line 116 is connected to the junction of the rheostat 110 and the contact 109, and a resistor network is interconnected between the lines 116 and 114. The network includes a first series circuit including resistors 118 and 120, a second series circuit including resistors 122 and 124, and a potentiometer 126 connected in parallel with the two aforementioned series circuits. The tap of the potentiometer 126 is connected through a normally open contact 128 of a TVR relay to the terminal 103.

The terminal 103 is also connected through a normally closed contact 130 of the TVR relay and a normally open contact 132 of a HUR relay to the junction of the resistors 122 and 124. The junction of the contacts 130 and 132 is connected through a normally closed contact 134 of the HUR relay and a CRP switch 136 to the line 112 directly (with the position of the CRP switch 136 as shown) and to the line 112 through a normally open contact 138 of a URX relay and to the junction of the resistors 118 and 120 through a normally closed contact of the URX relay when the CRP switch is in its other position.

The positions of the various relay contacts and the CRP switch illustrated in FIG. 5 is that which permits the speed of the DC motor 28 to be controlled by the settings of the rheostats 26a–26f. The relays URX, CPR, HUR and TVR are all controlled by operation of the program control unit 104 in such a manner as to override the control by the potentiometers 26a–26f when a different fixed speed is desired. Such different speeds are desired when the machine is in a traverse mode (when the TVR relay is energized), as well as other conditions when the HUR (head up relay) and URX (up relay) relays are energized, and when the CRP (creep switch) switch is operated to its other position. The values of the resistors and potentiometers 118–126 are selected to give the proper speeds when the various relays are energized, in accordance with the desired operation. When the Z-axis feed control is operative, however, the relay contacts are in the position shown, and the speed of the motor is controlled independently by one of the potentiometers 26a–26f. In the condition illustrated in FIG. 5, the switch 106e is closed, so that the motor 28 is controlled in accordance with the setting of the potentiometer 26e. The rheostat 110 is a trimmer resistor which can be adjusted so as to increase or decrease the amount of resistance between the terminals 102 and 104, whichever of the switches 106a–106f is closed.

In one embodiment of the present invention, the resistors, rheostats and potentiometers of FIG. 5 have the following values:

| | |
|---|---|
| 26a–26f | 50kΩ |
| 110 | 20kΩ |
| 118 | 30kΩ |
| 120 | 470Ω |
| 122 | 27kΩ |
| 124 | 1.2kΩ |
| 126 | 20kΩ |

The apparatus of the present invention has been completely described above such as to enable others skilled in the art to make and use the same. It will be apparent that various modifications and additions may be made if desired, without departing from the essential features of novelty of the present invention, which are intended to be defined and secured by the appended claims.

What is claimed is:

1. In a machine tool having spindle support means for supporting a spindle, and guide means adapted to guide movement of said support means in a direction parallel to the axis of said spindle; a variable speed drive for driving said support means relative to said guide, comprising, in combination, a rack secured to said support means, a pinion in engagement with said rack, a harmonic drive unit supported in fixed relation relative to said guide for driving said pinion, and a variable speed electric motor mounted in fixed relation relative to said harmonic drive unit for driving said harmonic drive and for moving said support means relative to said guide.

2. Apparatus according to claim 1, wherein said spindle support means includes a turret for supporting a plurality of spindles at equally spaced locations about the periphery of the spindle.

3. Apparatus according to claim 1, including means for mounting said harmonic drive unit in fixed relation to said guide means and means for mounting said variable speed motor directly to said harmonic drive unit, whereby the assembly of guide means, harmonic drive unit and motor form a rigid unit with said harmonic drive unit and said motor supported in coaxial alignment.

4. Apparatus according to claim 3, wherein the member of said guide means upon which is mounted said harmonic drive unit is provided with an aperture in coaxial alignment with said harmonic drive unit, for receiving a pinion supporting shaft of said harmonic drive unit.

5. Apparatus according to claim 4, including a bearing mounted in said aperture for supporting said pinion shaft.

6. Apparatus according to claim 3, including a panel for supporting a manual control for said variable speed motor, and means for mounting said panel in fixed relationship to said motor.

7. Apparatus according to claim 1, including a base including a supporting column, a carriage supported on said column and adapted for vertical movement relative thereto, and mounting means for mounting said harmonic drive unit and said variable speed electric motor on said carriage.

8. Apparatus according to claim 7, including manual control means supported on said carriage for controlling the speed of said variable speed motor.

9. Apparatus according to claim 1, wherein said guide means includes a pair of parallel, spaced guide members for guiding the movement of said spindle support means.

10. In a turret type machining center having a plurality of spindles supported on a turret, means for indexing said turret so that one of said spindles is in operating position, drive means for rotating the spindle in operating position, and slide means for moving said turret in a spindle feed direction parallel to the spindle axis, a spindle feed drive comprising, in combination, a speed reducing harmonic drive unit mounted in fixed relationship with said slide means for moving said turret in said spindle feed direction, and a variable speed DC motor mounted in fixed relationship with said harmonic drive unit for controlling the speed of said spindle feed.

11. Apparatus according to claim 10, including a plurality of adjustable controls for regulating the speed of said motor in each individual position of said turret, and a plurality of switches, one for each of said controls, for individually rendering said controls operative in response to the position of said turret.

12. Apparatus according to claim 11, wherein said controls comprise variable resistors, and including a motor control unit for said DC motor regulating the speed of said motor in accordance with the resistance included in a control circuit, and means including said switches for connecting one of said variable resistors in operative relation with said control circuit.

13. Apparatus according to claim 10, wherein said harmonic drive comprises a cup-shaped flex spline member having a generally cylindrical portion and an end portion, a case surrounding said flex spline member, bearing means supported by said case for supporting the end portion of said flex spline member, a pinion shaft connected to said end member and extending through an aperture in said case, means for mounting said DC motor on said case with a motor shaft of said motor coaxially extending into the cylindrical portion of said flex spline member, a wave generator mounted on said motor shaft within the cylindrical portion of said flex spline, and a fixed circular spline secured to said case at a position encircling said cylindrical portion and said wave generator.

* * * * *